United States Patent Office 3,378,534
Patented Apr. 16, 1968

3,378,534
COPOLYMERS OF OLEFINES WITH DITHIADIENES
Janine Ourgaud, Paris, France, assignor to Societe Nationale des Petroles d'Aquitaine, Tour Aquitaine, Courbevoie, France
No Drawing. Filed May 27, 1966, Ser. No. 553,307
Claims priority, application France, May 29, 1965, 18,846
8 Claims. (Cl. 260—79.5)

ABSTRACT OF THE DISCLOSURE

The present invention relates to a new type of copolymers of olefines, particularly α-olefine, with dithiadienes. It is concerned more especially with copolymers of α-olefines with those dienes which contain sulphur. Among the new copolymers, the invention concerns more especially the terpolymers obtained from ethylene, an aliphatic α-olefine and a dithiadiene, of which the molecule contains two —$CH_2S$ groups connected by an aliphatic chain and two alkenyl groups. The products mainly envisaged by the invention are copolymers of high molecular weight, the said copolymers being practically linear, amorphous, unsaturated and vulcanizable.

BACKGROUND OF THE INVENTION

The invention also relates to a process for the preparation of these new copolymers.

It is known to prepare rubber-like copolymers from ethylene and α-olefines, for example, ethylene, and propylene, but these materials have the disadvantage of being difficult to vulcanize on account of their saturation. In order to obtain elastomers which can be vulcanized by the usual means, it is necessary for the molecule to have a certain degree of unsaturation. The present invention does in fact make it possible to have in the new copolymers a degree of unsaturation which is sufficient for the conventional vulcanization by sulphur to become possible to the same extent as the vulcanization by means of free radical formers, particularly peroxides.

The process according to the invention makes it possible to obtain elastomers which still preserve the interesting properties of rubbers of the ethylene-propylene type, that is to say, an exceptional resistance to ozone, bad weather influences, heat and chemical agents, allied with good mechanical properties. These advantages are obtained by virtue of the choice of the constituent which provides the unsaturation, and also the well-investigated proportion of this constituent in the copolymer; from this latter point of view, the products according to the invention have particularly interesting properties when there is at least one double bond for 50 ethylene-α-olefine units, particularly for 50 ethylene-propylene units. On the other hand, the process according to the invention makes it possible for the unsaturation to be distributed very regularly in the terpolymer, this rendering possible to complete and uniform cross-linking of the molecules during the vulcanization reaction. In actual fact, the invention leads to terpolymers which, before vulcanization, are characterised by a practically amorphous state, this indicating a random distribution of the monomers and an absence of sequences of the same monomer. Thanks to these qualities, once the new copolymers are vulcanized, they provide interesting products which can be used for the manufacture of different objects, as for example electric cables, conveyor belts, tubes, sheaths, tyres and others.

The new process consists in copolymerizing ethylene with one more α-olefines, more especially propylene, and a certain proportion of adithiadiene, in the presence of a catalyst of Ziegler type.

The dithiadienes or sulphur dienes used according to the present invention are of the form:

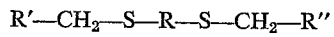

in which R is a saturated hydrocarbon chain of greater or lesser length and comprising 1 to 10 carbon atoms, that is to say, —$CH_2$— to —$(CH_2)_{10}$—; R' and R" designate like or different alkenyl radicals; they can comprise between 3 and 30 carbon atoms and have for example the following configurations:

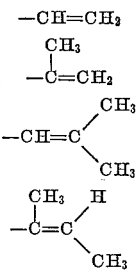

One non-limiting example of such a dithiadiene is 1,9-dimethyl-4,6-dithianonadi-1,8-ene

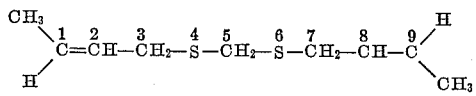

Another example is 1,10-tetramethyl-4,7-dithiadecadi-1,9-ene

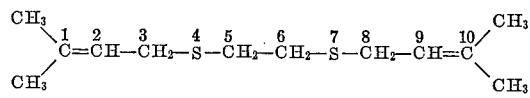

These sulphur dienes can be homopolymerized or copolymerized with ethylene by itself or in admixture with an α-olefine.

In the copolymerization reactions with the olefines according to the invention, one of the double bonds of the dithiadiene participates in the copolymerization reaction, while the second double bound remains available for the subsequent reactions, particularly for the crosslinking. This fact has been disclosed by infrared examination of the copolymers obtained by the new process; this examination showed the presence of unsaturations which permit the subsequent vulcanization of the copolymer by means of sulphur in accordance with the methods usually employed for rubber.

The copolymerization according to the invention is catalyzed by the known systems comprising an alkylated compound of one or more metals of the groups I, II or III of the Periodic System of the Elements (A) and a halogenated compound of a transition metal of one of the Groups IV, V or VI (B). Such catalytic systems, formed for example by aluminium alkyls and halides of Ti, Zr, V, Mo, etc., have been described by way of example in French Patent No. 1,121,962 of June 5, 1955, and in French Patent No. 1,162,882 of Dec. 20, 1956.

For the formation of the catalyst system, the compounds A can be mixed with the compounds B before their introduction into the reactor; the catalysts can thus be preformed and possibly "aged" in order then to be introduced into the mixture to be polymerized continuously or intermittently. The compounds A and B can also be separatedly introduced.

Preferably, the catalyst system comprises quantities of compounds A and B such that the molar ratio between the metal of A and the transition metal of B is between 1 and 30.

The polymerization is effected in the presence of a third solvent or even with the excess of one of the monomers for forming the liquid phase of the reaction medium. The solvents which can be used are the same as those which are usually employed in the polymerization and copolymerization of olefines, namely, aliphatic, cycloaliphatic, or aromatic hydrocarbons, for example, heptane, cyclohexane, benzene, ethylbenzene or mixtures of such solvents. It is also possible to employ halogenated hydrocarbons which are neutral with respect to the catalyst, for example, chlorobenzene, tetrachlorethylene.

The copolymerization is generally carried out between −80° C. and +110° C., the preferential range being from −30° to +50° C.

Although the pressures usually applied are of the order of 1 to 10 atm., it is possible and sometimes necessary to work under higher or lower pressures. In particular, it may be advantageous to work at a temperature and a pressure such that one or more of the monomers present are liquid during the reaction and thus serve as distributing agent.

The dithiadiene, added in accordance with the invention, is generally introduced all at once into the reactor as such or even in solution in a solvent before the addition of the catalyst system. Nevertheless, it is possible to introduce all or part of this resinic compound during the polymerization, in a continuous or intermittent manner.

The process according to the invention can be carried out continuously; in this case, the solvent, the monomers and the catalyst system are introduced continuously into a polymerization zone at rates such that their residence time in this zone is sufficient to obtain the desired concentration of copolymers in the reaction mixture. Generally, the necessary residence time decreases when the concentration of monomers and catalysts in the supply mixture is increased.

In the new products according to the invention and particularly in the terpolymers, the lower limit for the ethylene content is not critical, but the upper limit should preferably by 75 mol percent in order to avoid any crystallinity of the polyethylene type. As regards the content of α-olefine in the amorphous terpolymers, it can normally vary from 5 to 75 mol percent. The total content in the terpolymer of dithiaalkene, that is to say, of the grouping formed by copolymerization of the dithiadiene defined above, can vary from 0.1 to 20 mol percent. In general terms, the composition of the copolymers according to the invention can vary within wide limits as a function of those of the mixture of monomers.

The duration of the copolymerization, which is primarily a function of the temperature and the nature of the catalyst system, generally varies between approximately 1 hour and 8 hours.

At the end of the operation, the catalyst is destroyed in known manner, the reaction medium is subjected to a steam distillation in vacuo at a temperature from 30° to 60° C., with a view to eliminating the solvent and monomers which have not been transformed. The copolymer obtained or "gum" is finally dried in vacuo at about 40° C.

The gum thus obtained has a degree of unsaturation sufficient to be capable of being vulcanized by the conventional techniques which are applicable to unsaturated elastomers. The vulcanization can be carried into effect with the usual means of the rubber industry.

The following example illustrates the invention without limiting the scope thereof.

EXAMPLE

The reaction is effected in a cylindrical glass reactor with a capacity of 1000 ml., the reactor being provided with a stirrer device, a thermometer, two funnels for the introduction of the catalyst pair, a condenser with an outlet tube for the gases, a supply tube for the gases terminating near the bottom of the reactor in a ring formed with several orifices, in order to permit a better diffusion of the gaseous mixture within the solvent.

The reactor is placed in a bath thermostatically controlled at −5° C.±1° C.

The gaseous monomers, freed from their harmful impurities, particularly traces of humidity and air, under rates of flow controlled by rotameters and counters, are mixed before their introduction into the reaction medium.

400 ml. of a mixture of cyclohexane-heptane with 20% by volume of heptane, previously dried and degasified, and 1 g. of 1,9-dimethyl-4,6-dithianonadi-1,8-ene are introduced into the reactor, which is maintained under a stream of nitrogen.

6 millimoles of VOCl$_3$, diluted to 150 ml. with the cyclohexaneheptane mixture, are introduced into one of the funnels above the reactor, while 30 millimoles of $$(C_2H_5)_2AlCl$$

brought to 150 ml. with the cyclohexane-heptane mixture are introduced into the other funnel, both funnels also being kept under nitrogen.

The flow of nitrogen is stopped and a mixture of ethylene and propylene is introduced into the reactor at the rate of 70 litres (at N.T.P.) per hour; the volumetric ratio between propylene and ethylene is 2.33.

After five minutes, the rate of flow being preserved, the propylene/ethylene ratio is brought to 0.5 and the constituents of the catalyst system are introduced dropwise, so as to be completely injected in 30 minutes.

Every five minutes, the readings of the temperature and of the "inlet" and "outlet" counters make it possible to follow the reaction and to know the absorption of the gases.

When the absorption ceases, that is to say, after 75 minutes, 150 ml. of water are poured in for destroying the catalyst.

The reaction mixture is freed from the solvent by steam distillation in vacuo and at 50° C.

20 g. of slightly elastic gum are obtained.

I claim:

1. A substantially linear, amorphous, sulfur vulcanizable, unsaturated polymer of ethylene, an aliphatic α-olefine of the formula R—CH=CH$_2$, wherein R is an alkyl of from 1 to 6 carbon atoms and a dithiadiene of the formula R'CH$_2$S(CH$_2$)$_n$SCH$_2$R'' wherein R' and R'' are alkenyl groups of from 3 to 30 carbon atoms and $n$ is an integer of from 1 to 10.

2. A polymer according to claim 1 wherein the proportion of ethylene constitutes from 5 to 75 mole percent of the polymer.

3. A polymer according to claim 2 wherein the aliphatic α-olefine is propylene.

4. A polymer according to claim 1 wherein the aliphatic α-olefine is propylene.

5. A polymer according to claim 1 which is hardened by vulcanization with sulfur.

6. A polymer according to claim 5 wherein the aliphatic α-olefine is propylene.

7. A polymer according to claim 1 which is hardened by heating with a free radical forming agent.

8. A substantially linear, amorphous, sulfur vulcanizable unsaturated polymer of ethylene, an aliphatic α-olefine of the formula R—CH=CH$_2$ wherein R is an alkyl of from 1 to 6 carbon atoms and 1,9-dimethyl-4,6-dithianonadi-1,8-ene.

References Cited

UNITED STATES PATENTS 2,563,383   8/1951   Vaughn et al. _____ 260—79.7
2,664,414   12/1953  Morris et al. _____ 260—79.7
3,335,119   8/1967   D'Alelio _____ 260—79.7

JOSEPH L. SCHOFER, *Primary Examiner.*

D. K. DENENBERG, *Assistant Examiner.*